Patented July 7, 1936

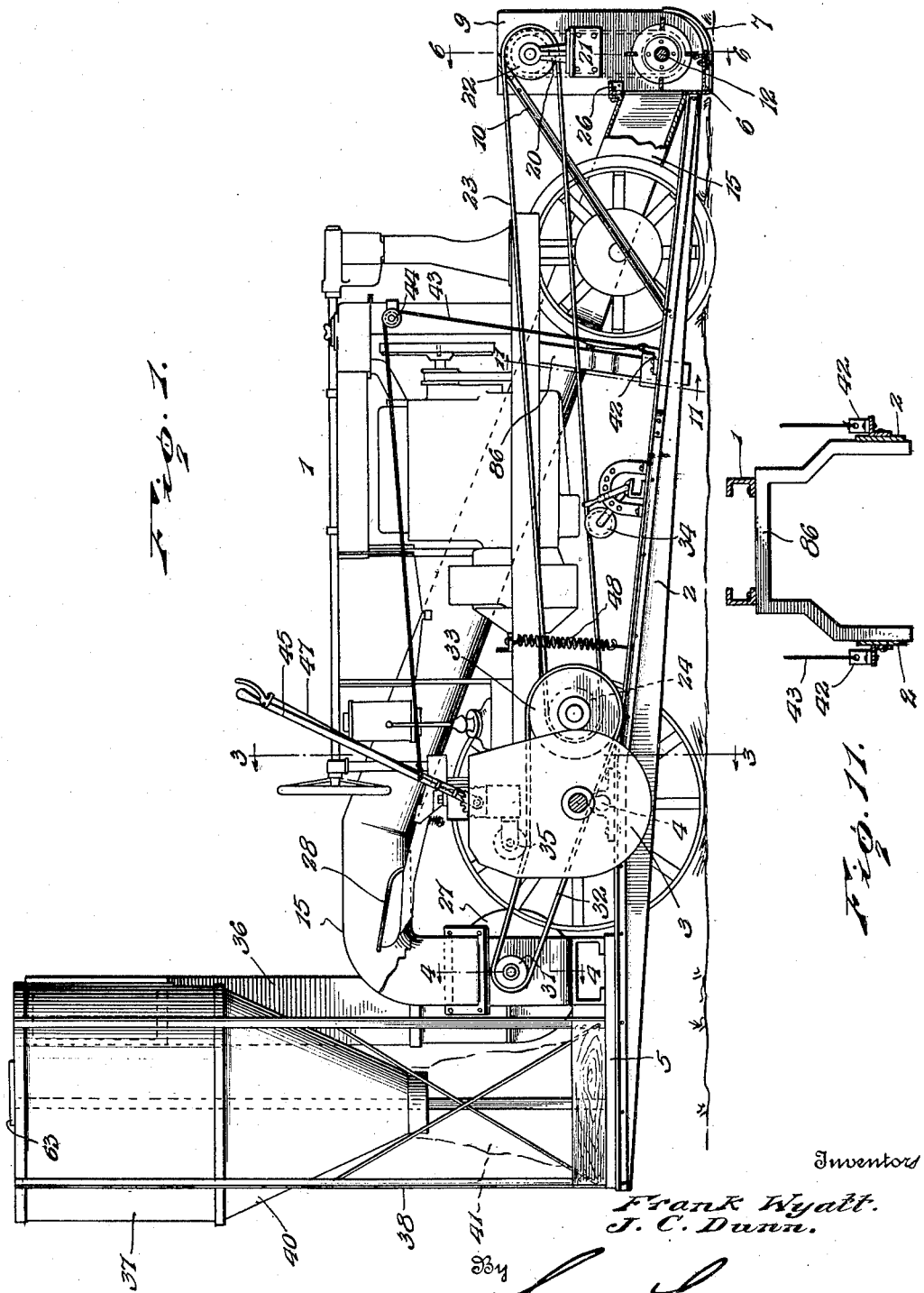

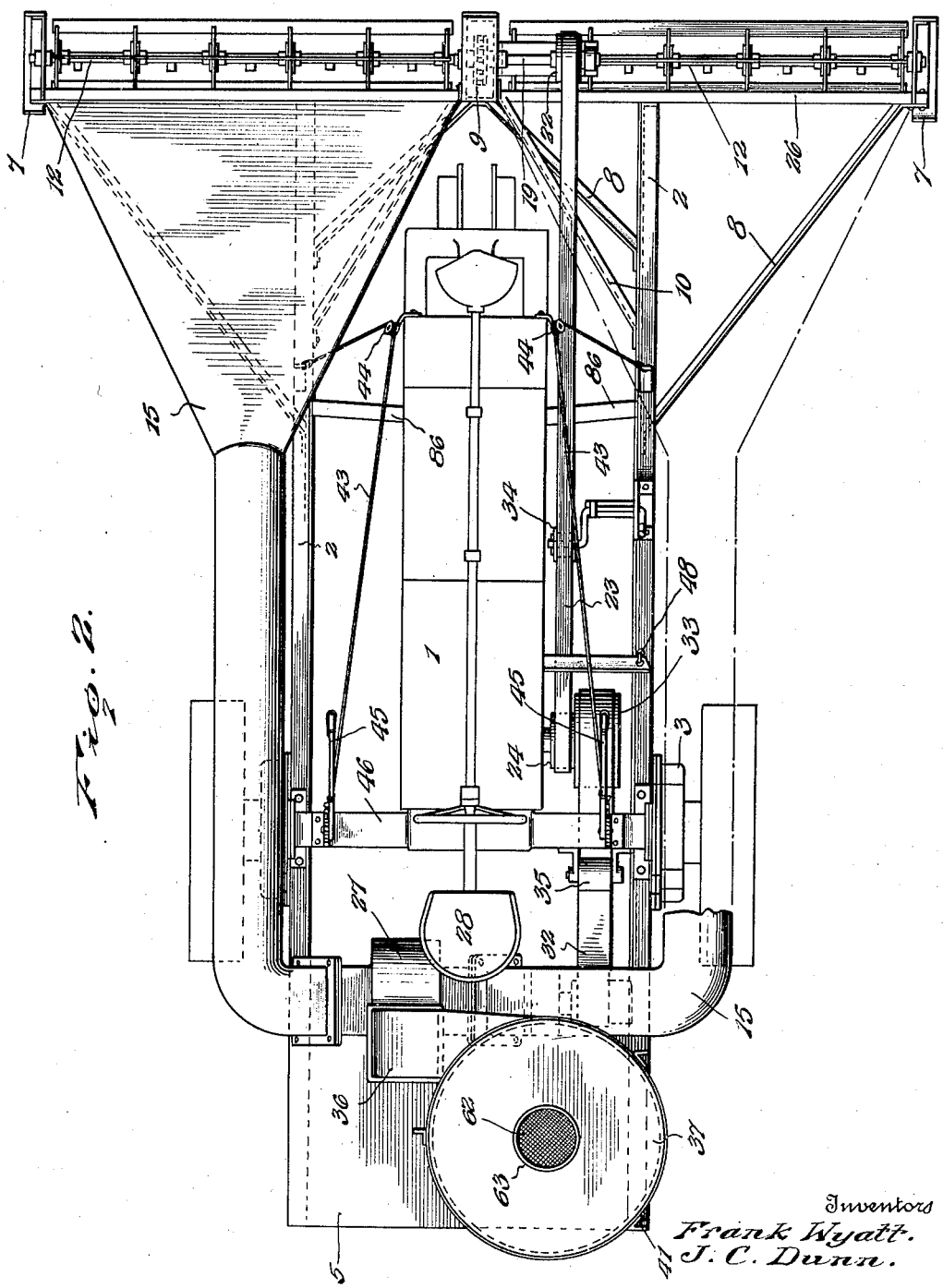

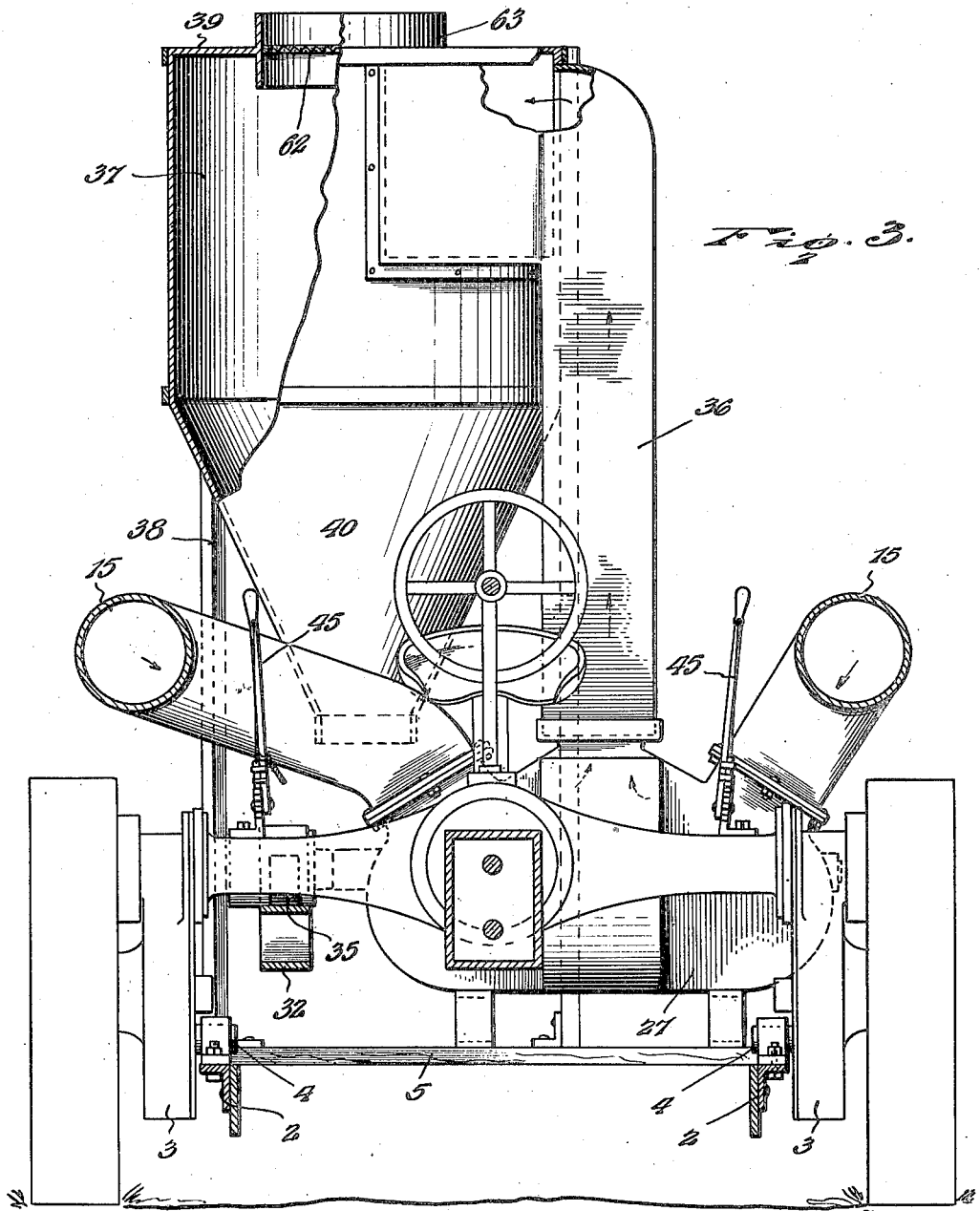

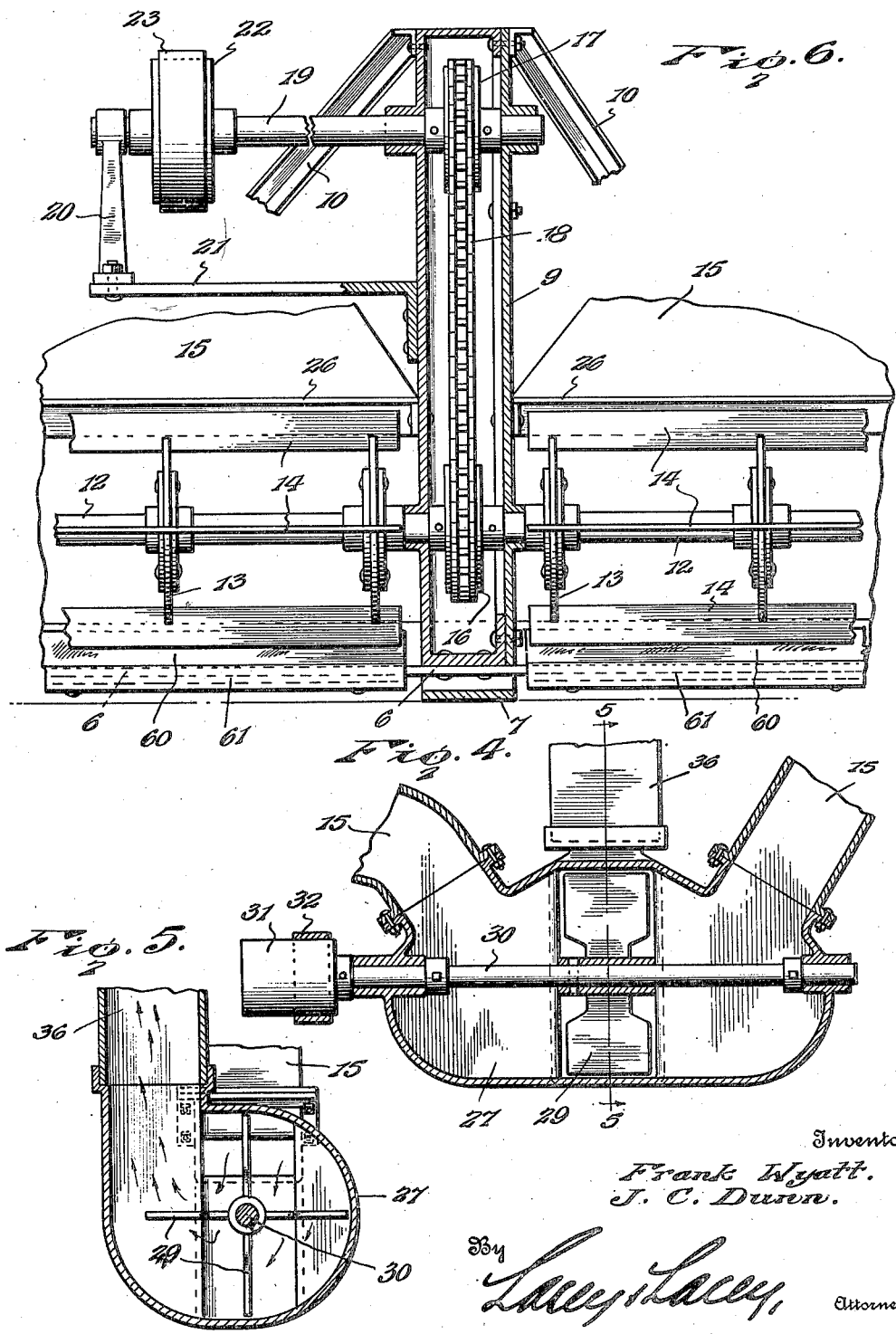

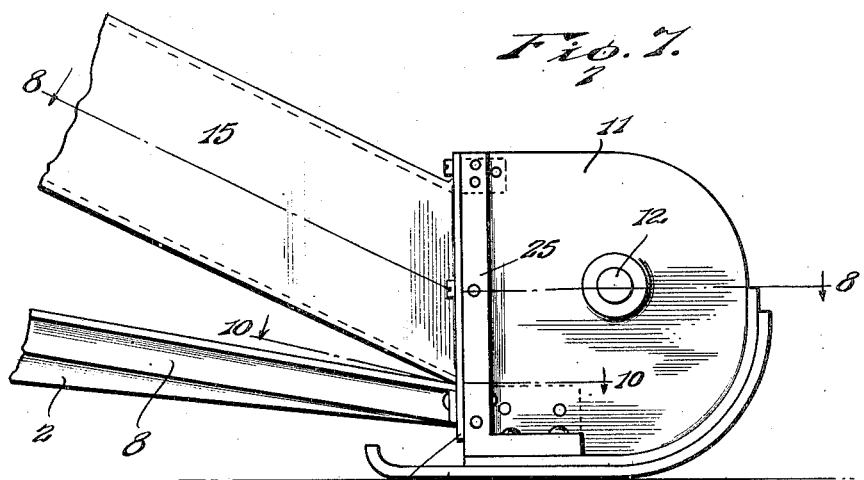
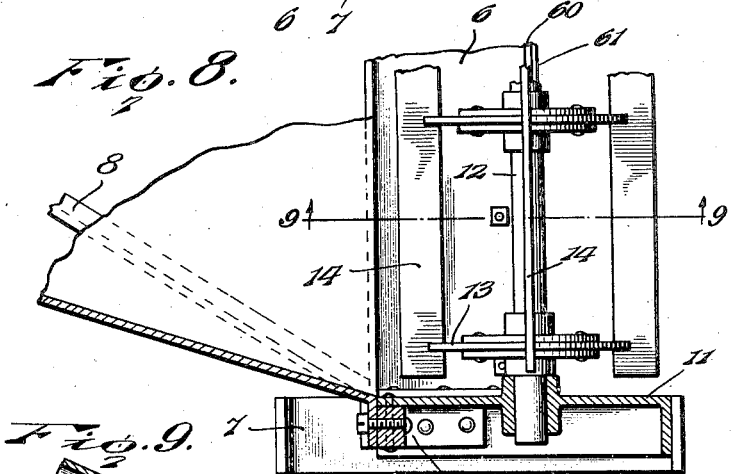
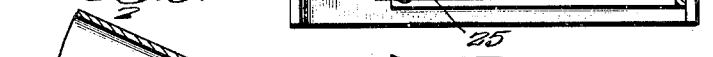
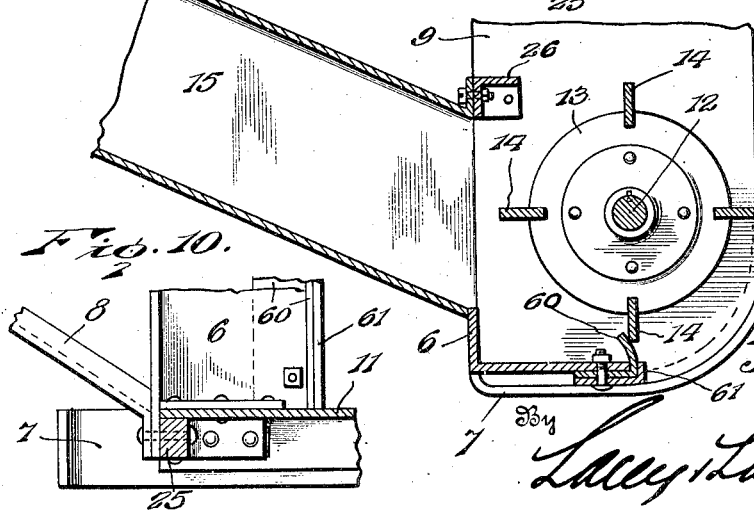

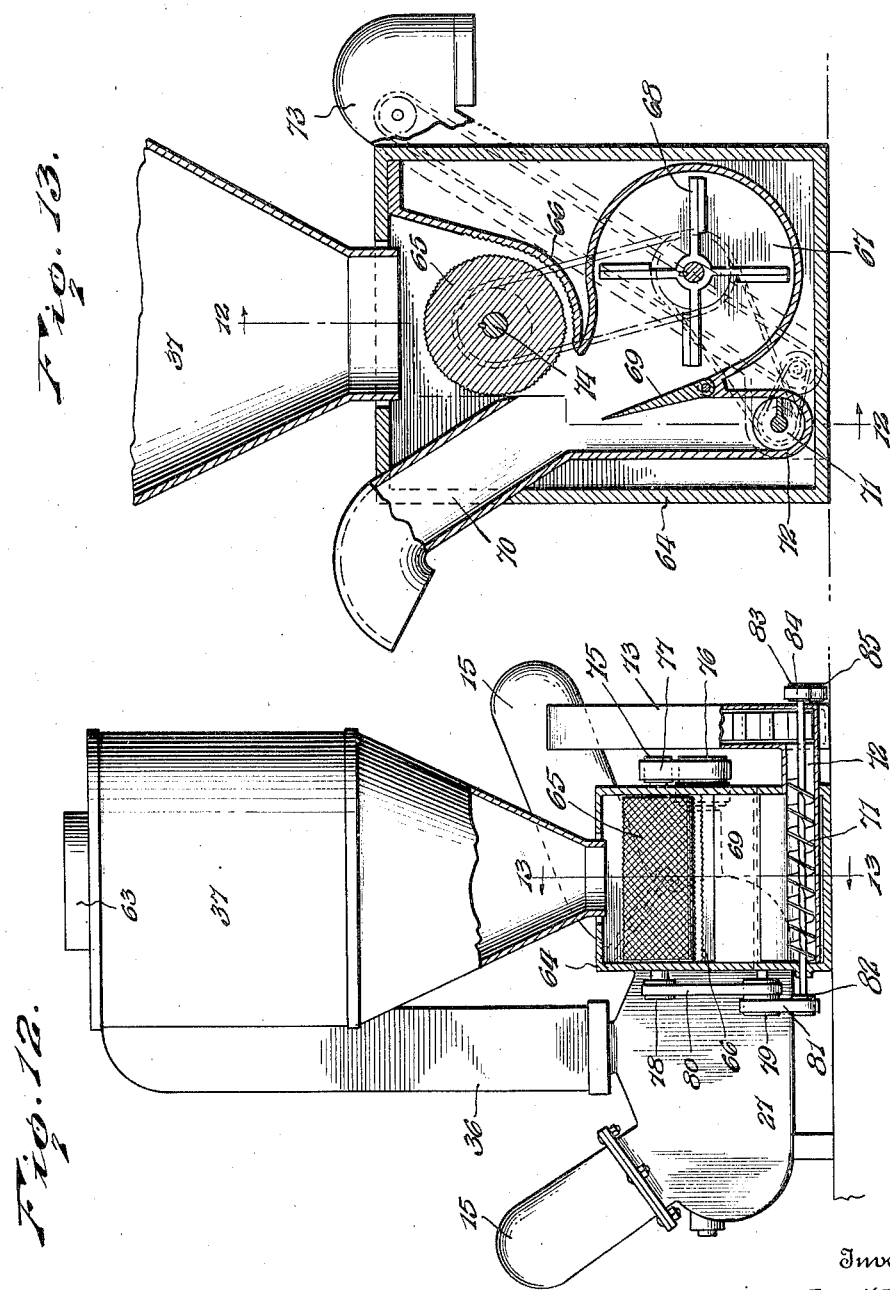

2,046,932

UNITED STATES PATENT OFFICE 2,046,932

CLOVER SEED HARVESTER

Frank Wyatt and James C. Dunn, Oakdale, Calif.

Application July 16, 1934, Serial No. 735,470

4 Claims. (Cl. 56—19)

This invention relates to harvesting machinery and has special reference to machines for harvesting seed clover and similar crops which grow close to the ground. The object of the invention is to provide a simple mechanism which may be mounted upon a tractor and operated by the power of the tractor to draw the clover heads to the rear of the machine and deposit them in bags or deliver them to a cleaning mechanism. The invention is illustrated in the accompanying drawings and will be hereinafter fully described, the novel features being particularly defined in the appended claims.

In the drawings,

Figure 1 is a side elevation, with parts removed and parts in section, of a tractor having our improved harvester mechanism mounted thereon.

Figure 2 is a top plan view of the same.

Figure 3 is a transverse section on the line 3—3 of Figure 1.

Figure 4 is an enlarged section on the line 4—4 of Figure 1.

Figure 5 is a section on the line 5—5 of Figure 4.

Figure 6 is an enlarged section on the line 6—6 of Figure 1.

Figure 7 is an enlarged end elevation of the beater.

Figure 8 is a section on the line 8—8 of Figure 7.

Figure 9 is a section on the line 9—9 of Figure 8.

Figure 10 is a detail section on the line 10—10 of Figure 7.

Figure 11 is a detail section on the line 11—11 of Fig. 1.

Figure 12 is a rear elevation, with parts in section, of a cleaning and threshing mechanism.

Figure 13 is a section on the line 13—13 of Figure 12, the line 12—12 in this figure indicating the planes of the section shown in Figure 12.

The tractor, indicated at 1, may be of any known or approved form and in itself constitutes no part of the invention. It is, therefore, illustrated in a more or less conventional manner and it is to be understood that the harvesting mechanism may be propelled by animal power or otherwise.

In carrying out the present invention, there are employed a pair of sills 2 which are hingedly mounted upon the inner sides of the rear gear casings 3 which form parts of the particular tractor illustrated. These sills extend both forwardly and rearwardly from the hinge or pivot mounting 4 and, at their rear ends, carry a platform 5 upon which an operator may stand. The front ends of the sills 2 carry the beater which includes an angle bar 6 to which, at the ends thereof, are secured runners 7 which rest upon the ground and support the beater while providing for its easy progress over the field. Along the front edge of the bar 6 are flexible strips 60 which are secured in place by clamp bars 61 bolted to the under side of the base bar 6, the strips 60 projecting above the bar 6 as shown clearly in Fig. 9. The sills 2 are connected with the beater by braces 8, and a central vertically disposed gear casing 9 is secured to the bar 6 and is also connected by braces 10 with the sills 2, as will be understood upon reference to Figures 1 and 2. End plates 11 are connected to the outer ends of the bar 6 and beater shafts 12 are journaled in said end plates 11 and in the sides of the gear casing 9, the shafts extending across the entire width of the harvester and having secured thereto, at intervals, disks 13 in the peripheries of which are secured beater bars or blades 14 which extend parallel with the stripper. As shown most clearly in Figure 9, the parts are so proportioned that when the shafts 12 are rotated the edges of the blades 14 will ride across the edges of the strips 60 and thereby beat off or break off the clover heads and toss them rearwardly into suction pipes 15 which are arranged to receive them. The gear casing 9, as will be understood upon reference to the drawings, has its greater dimension extending vertically and near the lower end of said casing a sprocket gear 16 is mounted therein and firmly connected with the inner ends of the alined beater shafts 12. A coacting sprocket gear 17 is mounted in the upper end of the gear casing 9 and a sprocket chain 18 is trained about the two sprockets so that motion may be imparted to the beater shafts. The shaft 19, which carries the upper sprocket gear 17, extends laterally from the gear casing and has its outer end supported in a bearing post 20 which is carried upon a bracket 21 secured in turn to the side of the gear casing. A pulley 22 is mounted upon the shaft 19 and a belt 23 is trained about said pulley and about a power take-off pulley 24 on the tractor so that the power of the tractor is utilized to impart motion to the beater shafts in an obvious manner.

In order to reinforce the end structure, brackets 25 are secured upon the outer sides of the end bearing plates 11, the ends of the bar 6, the upper sides of the runners, and the front ends of the braces 8, as shown most clearly in Figs. 8 and 10, so that a very rigid structure is provided and the beater mechanism will be firmly supported in such a manner that it will operate easily at all times.

The suction pipes 15 are mounted upon the sides of the tractor and their front ends are laterally expanded, as shown most clearly in Figure 2, so that they will extend the full length of the beater and be so arranged as to receive all the clover heads struck off by the beater blades. The upper edges of the flared mouths of the suction pipes are secured to angle bars 26 which are secured at their ends to the gear casing 9 and the end plates 11 and serve to reinforce and impart rigidity to the entire structure, the lower edges of said mouths being secured to the bar 6. The rear ends of the suction pipes are turned inwardly toward the center of the machine and are connected directly with a blower casing 27 disposed transversely of the machine at the rear of the operator's seat, which is indicated at 28. A fan 29 is disposed within the blower casing 27 at the center of the same and is carried by a shaft 30 journaled in the ends of said casing and having one end extended through the casing and equipped with a pulley 31 about which is trained a belt 32 which extends forwardly to the power take off pulley 33 about which it is trained so that the fan will be driven from the power take-off, as will be understood. Belt tighteners, indicated at 34 and 35, are mounted upon the sills and upon some convenient part of the tractor frame to bear against the respective belts 23 and 32 so that wear upon the belts will be compensated and the belts kept always in a proper taut condition. Rising centrally from the blower casing 27 is an outlet pipe 36 which has its upper end secured to the side of a hopper 37 supported from the platform 5 by a suitable frame 38. A cover 39 may be provided for the upper end of the hopper 37, and the lower end of the hopper is tapered, as shown at 40, and is adapted to have a bag holder mounted upon its lower end so that a bag, indicated at 41, may be placed in position to receive the seeds which have been delivered to the hopper. The cover or top 39 has a central opening in which is secured a screen 62 and around which is disposed a guard ring 63. The air discharged into the hopper will escape through the screen with the lighter particles of dust carried thereby while the seed and heavier particles will drop by gravity to the bottom of the hopper, separation of the seed from the other matters being thus automatically effected. The air enters the hopper tangentially so that a whirling motion is imparted thereto within the hopper and the heavier elements are held toward the wall of the hopper by centrifugal force and thus kept from the screen.

While, as stated, a seed-receiving bag may be hung on the lower end of the hopper, we provide a cleaning and threshing machine to receive and treat so that the seed may be delivered from the machine ready for the market. This cleaning and threshing mechanism is shown in Figs. 12 and 13 and includes a box or casing 64 disposed under the delivery spout of the hopper and having an opening in its top into which the spout fits. Immediately under the spout, a threshing cylinder 65 is mounted in the case to cooperate with a concave 66 to separate the seed and the chaff. Below the cylinder and concave, a fan casing 67 and a winnowing fan 68 is mounted in said casing, a baffle 69 being pivoted at one side of the outlet of the casing to direct the blast across the stream of seeds and chaff flowing over the edge of the concave. The chaff will be blown out through the discharge pipe 70 leading from one side of the casing, while the seed will drop behind the baffle into a worm conveyer 71 arranged within a trough 72 located in the lower portion of the case and extending through an end of the same to deliver into the lower end of an elevator 73. The elevator delivers the seed into a bag suspended at the upper end thereof as will be understood.

The threshing cylinder is fixed upon a shaft 74 which extends through the casing and has a pulley 75 on one end about which and a power take off pulley 76 on the tractor a belt 77 is trained. On the opposite end of the cylinder shaft is a pulley 78 and a double pulley 79 is secured on the corresponding end of the fan shaft, a belt 80 being trained about said pulleys. A belt 81 is trained about the pulley 79 and a pulley 82 on the corresponding end of the worm conveyer shaft, while a pulley 83 is secured on the opposite end of the conveyer shaft and operatively connected by a belt 84 with a pulley 85 on the lower shaft of the elevator. It will thus be seen that all elements of the threshing and cleaning mechanism are driven from the power take-off of the tractor, and it will be understood that the particular arrangement of the driving elements may be varied according to circumstances.

The sills are pivotally mounted upon the gear casings 3, as has been stated, and to the upper sides of the sills, at the rear of the braces, are secured brackets 42 to which are attached the front ends of cables 43 which are trained about pulleys 44 mounted upon the tractor and which extend rearwardly to points near the operator's seat where they are attached to hand levers 45 mounted upon the rear axle housing 46 and equipped with latches 47 of the usual form. By properly adjusting the levers, the beater mechanism may be lowered to the ground to act upon the crop or may be raised from the ground when the machine is to travel along a road or from one field to another field. Springs 48 are attached to and extend between the sills and the chassis of the tractor so as to cushion the movements of the sills and relieve the strain upon the adjusting cables. To prevent relative lateral movement of the sills, an inverted U-shaped bracket 86 is secured to and depends from the tractor with its legs bearing slide plates on the inner sides of the sills as shown in Figure 11.

The operation will, it is thought, be readily understood. The machine is driven over the field by the usual operation of the tractor and the beater mechanism is lowered so as to run upon the surface of the field. The gearing of the tractor is adjusted so that not only will the ground wheels of the tractor be rotated to effect progress of the tractor but power will also be transmitted through the power take-off and the described connections to rotate the beater shafts and drive the fan 29. The rotation of the beater shafts will cause the blades to successively impinge upon the clover heads which beat them against the edge of the stripper bars 6 so that the heads will be removed from the stems and will be thrust rearwardly into the mouths of the suction pipes 15. As the fan 29 is driven simultaneously with the beaters, the suction created will carry the clover heads with the seeds and husks to the blower casing 27 and then drive them upwardly through the delivery pipe 36 into the hopper. As has been stated, the air which has brought the crop to the hopper may escape through the upper open end thereof and the crop be bagged at the discharge opening of the hopper, or a cleaning and threshing mechanism may be connected with the hopper so that the seed will be at once clean and the chaff and straw driven off.

Our mechanism is very simple and compact and is not apt to get out of order. It has been found to operate efficiently and may be readily mounted upon any tractor without substantial structural changes.

Having thus described the invention, we claim:

1. A clover harvester comprising a tractor, sills, means for pivotally mounting the sills at opposite sides of said tractor, arms extending from sides of the tractor, means for adjusting the front ends of the sills vertically and maintaining them in a set position consisting of latch levers carried by the arms and cables extending forwardly from the levers about guides and attached to the sills, a platform carried by the rear ends of the sills, a stripper bar carried by the front ends of the sills, a beater supported upon the front ends of the sills and arranged to cooperate with the stripper bar, means for rotating the beater by the power of the tractor, a suction pipe extending from the beater and stripper bar to the platform, a container supported above the platform, and suction means carried by the platform between the pipe and container and actuated by power of the tractor for creating a suction through the pipe whereby the crop may be received from the beater and delivered to the container.

2. A clover harvester comprising a tractor having rear gear casings at its sides, a pair of sills extending longitudinally of the tractor at opposite sides thereof, means for pivotally mounting the sills intermediate their ends upon the gear casings of the tractor, harvesting mechanism carried by the front ends of the sills in front of the tractor, a platform carried by the rear ends of the sills back of the tractor, means for conveying the crop from the harvesting mechanism to the platform, springs attached to the sills and a fixed support carried by the tractor in front of the gearing casings and yieldably resisting downward movement of front ends of the sills, hand levers mounted on the tractor at opposite sides thereof, pulleys on the forward portion of the tractor, and cables attached to the hand levers and trained about the pulleys with the forward portion extending downwardly and attached to the sills in advance of the springs.

3. A harvesting mechanism comprising a frame having longitudinally extending sills at its sides, means for pivotally mounting the sills upon the sides of a tractor with front and rear ends of the sills projecting from the tractor, a platform carried by the rear ends of the sills for disposition back of a tractor, a beater mechanism carried by the front ends of the sills for disposition in front of a tractor, means for operating said beater mechanism by the power of the tractor, suction pipes extending longitudinally of the frame from the beater mechanism to the platform, a blower casing mounted on the platform and in communication with the suction pipe, a fan within the blower casing, means for driving said fan by the power of the tractor, a support rising from the platform, a hopper supported by said support above the platform, and a delivery pipe leading from the blower casing into the upper end of the hopper whereby a crop will be drawn from the beater mechanism through the suction pipe and delivered into the hopper.

4. A clover harvester comprising alined stripper bars, means for supporting said bars at the front of a tractor, alined beater shafts arranged above and in advance of said bars, disks secured at intervals upon the shafts, blades secured to the disks, flexible strips extending longitudinally of the stripper bars and projecting upwardly therefrom for engagement by the blades as the shafts rotate, and means for rotating the shafts whereby the blades will be caused to move across the edges of the flexible strips.

FRANK WYATT.
JAMES C. DUNN.